(12) United States Patent
Miller

(10) Patent No.: US 11,427,058 B1
(45) Date of Patent: Aug. 30, 2022

(54) TARPAULIN SYSTEM FOR A CONTAINER DISPOSED ON A TRUCK OR A ROLL-OFF TRAILER

(71) Applicant: Air Tarp Systems, LLC, Detroit, MI (US)

(72) Inventor: Nathan Miller, Dearborn, MI (US)

(73) Assignee: Air Tarp Systems, LLC, Detroit, MI (US)

( * ) Notice: Subject to any disclaimer, the term of this patent is extended or adjusted under 35 U.S.C. 154(b) by 0 days.

(21) Appl. No.: 17/313,745

(22) Filed: May 6, 2021

(51) Int. Cl.
*B60J 7/08* (2006.01)
*B60P 7/04* (2006.01)
*B60J 7/16* (2006.01)

(52) U.S. Cl.
CPC ............. *B60J 7/085* (2013.01); *B60J 7/1607* (2013.01); *B60P 7/04* (2013.01)

(58) Field of Classification Search
CPC .................. B60J 7/08; B60J 7/085; B60P 7/04
USPC .................................. 296/98, 100.01, 100.14
See application file for complete search history.

(56) References Cited

U.S. PATENT DOCUMENTS

| | | | |
|---|---|---|---|
| 6,464,283 B2 | 10/2002 | Haddad, Jr. | |
| 6,695,383 B2 | 2/2004 | Wood | |
| 7,111,891 B2 * | 9/2006 | O'Brian | B60J 7/085 296/100.1 |
| 7,350,846 B2 * | 4/2008 | Smith | B60J 7/085 296/100.18 |
| 7,370,904 B2 | 5/2008 | Wood, Jr. et al. | |
| 9,669,752 B2 * | 6/2017 | Bielfelt | B60P 7/04 |
| 10,086,682 B2 * | 10/2018 | Schmeichel | B60P 7/04 |
| 2008/0136211 A1 | 6/2008 | Gomes et al. | |
| 2010/0052357 A1 * | 3/2010 | Howell | B60J 7/085 296/100.18 |

\* cited by examiner

*Primary Examiner* — Jason S Daniels
(74) *Attorney, Agent, or Firm* — Burris Law, PLLC

(57) ABSTRACT

A tarpaulin system for a container includes one or more rods extending transversely from the container, a pneumatic system including a pneumatic actuator, a roll-out cover system including a spring, a first support plate including a first surface and a second surface, a second support plate, and one or more rod housings extending transversely from the container. The one or more rod housings are slidably disposed along the one or more rods, and the roll-out cover system is at least partially attached to the first surface. The one or more rod housings are attached to the second surface, and the pneumatic system is attached to the second support plate. The pneumatic actuator is configured to slidably and transversely move the roll-out cover system along the one or more rods based on a pneumatic force generated by the pneumatic actuator.

20 Claims, 6 Drawing Sheets

TARPAULIN SYSTEM FOR A CONTAINER DISPOSED ON A TRUCK OR A ROLL-OFF TRAILER

FIELD

The present disclosure relates to a tarpaulin system for a container disposed on a truck or a roll-off trailer.

BACKGROUND

The statements in this section merely provide background information related to the present disclosure and may not constitute prior art.

Trucks (e.g., dump trucks, container trucks, etc.) and/or roll-off trailers may include open-top containers that store and transport various materials, such as waste, scrap metal, finished parts, raw materials, and/or other similar materials. However, material that is loaded into the open-top container may be disturbed and/or displaced from the open-top containers by external forces, such as uneven roadways or wind. As such, the open-top container may be covered during transport using a tarpaulin system extending transversely across a width of the open-top container to prevent the materials therein from being displaced.

SUMMARY

This section provides a general summary of the disclosure and is not a comprehensive disclosure of its full scope or all of its features.

The present disclosure provides a tarpaulin system for a container. The tarpaulin system includes one or more rods extending transversely from the container, a pneumatic system including a pneumatic actuator, a roll-out cover system including a spring, a first support plate including a first surface and a second surface, a second support plate, and one or more rod housings extending transversely from the container. The one or more rod housings are slidably disposed along the one or more rods, and the roll-out cover system is at least partially attached to the first surface. The one or more rod housings are attached to the second surface, and the pneumatic system is attached to the second support plate. The pneumatic actuator is configured to slidably and transversely move the roll-out cover system along the one or more rods based on a pneumatic force generated by the pneumatic actuator.

In one form, the pneumatic system further includes a pneumatic housing at least partially surrounding the pneumatic actuator.

In one form, the pneumatic housing is attached to the second support plate.

In one form, the pneumatic actuator includes a pneumatic cylinder and a pneumatic piston rod that operatively couples the pneumatic actuator and the spring, and the pneumatic piston rod is configured to move the roll-out cover system along the one or more rods based on the pneumatic force.

In one form, the one or more rod housings have a geometry to accommodate a geometry of the one or more rods.

In one form, the one or more rod housings have a first diameter, the one or more rods have a second diameter, and the first diameter is greater than the second diameter.

In one form, the one or more rod housings have an inner diameter and an outer diameter, the one or more rods have a second diameter, the inner diameter is greater than the second diameter, and the outer diameter is greater than the inner diameter.

In one form, the roll-out cover system further includes a cover housing at least partially surrounding the spring.

In one form, the cover housing is attached to the first surface.

In one form, the roll-out cover system includes a pivot arm.

In one form, the pivot arm is rotatable along a vertical axis of the container to cover the container.

The present disclosure provides a tarpaulin system for a container. The tarpaulin system includes one or more rods extending transversely from the container, a pneumatic system including a pneumatic actuator and a pneumatic housing, and a roll-out cover system including a spring and a cover housing. The tarpaulin system includes a first support plate comprising a first surface and a second surface, a second support plate, and one or more rod housings extending transversely from the container. The one or more rod housings are slidably disposed along the one or more rods, the cover housing is attached to the first surface and at least partially surrounds the spring, and the one or more rod housings are attached to the second surface. The pneumatic housing is attached to the second support plate and at least partially surrounds the pneumatic actuator, and the pneumatic actuator is configured to slidably and transversely move the roll-out cover system along the one or more rods based on a pneumatic force generated by the pneumatic actuator.

In one form, the pneumatic actuator includes a pneumatic cylinder and a pneumatic piston rod that operatively couples the pneumatic actuator and the spring, and the pneumatic piston rod is configured to move the roll-out cover system along the one or more rods based on the pneumatic force.

In one form, the one or more rod housings have a geometry to accommodate a geometry of the one or more rods.

In one form, the one or more rod housings have a first diameter, the one or more rods have a second diameter, and the first diameter is greater than the second diameter.

In one form, the one or more rod housings have an inner diameter and an outer diameter, the one or more rods have a second diameter, the inner diameter is greater than the second diameter, and the outer diameter is greater than the inner diameter.

In one form, the roll-out cover system includes a pivot arm.

In one form, the pivot arm is rotatable along a vertical axis of the container to cover the container.

The present disclosure provides a tarpaulin system for a container. The tarpaulin system includes one or more rods extending transversely from the container, a pneumatic system including a pneumatic actuator and a pneumatic housing, and a roll-out cover system including a spring, a cover housing, and a pivot arm. The tarpaulin system includes a pivot arm attached to the roll-out cover system, a first support plate comprising a first surface and a second surface, a second support plate, and one or more rod housings extending transversely from the container. The one or more rod housings are slidably disposed along the one or more rods, the one or more rod housings have a geometry to accommodate a geometry of the one or more rods, and the cover housing is attached to the first surface and at least partially surrounds the spring. The one or more rod housings are attached to the second surface, the pneumatic housing is attached to the second support plate and at least partially surrounds the pneumatic actuator, and the pneumatic actuator is configured to slidably and transversely move the roll-out cover system along the one or more rods based on a pneumatic force generated by the pneumatic actuator.

In one form, the pivot arm is rotatable along a vertical axis of the container to cover the container.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1A:
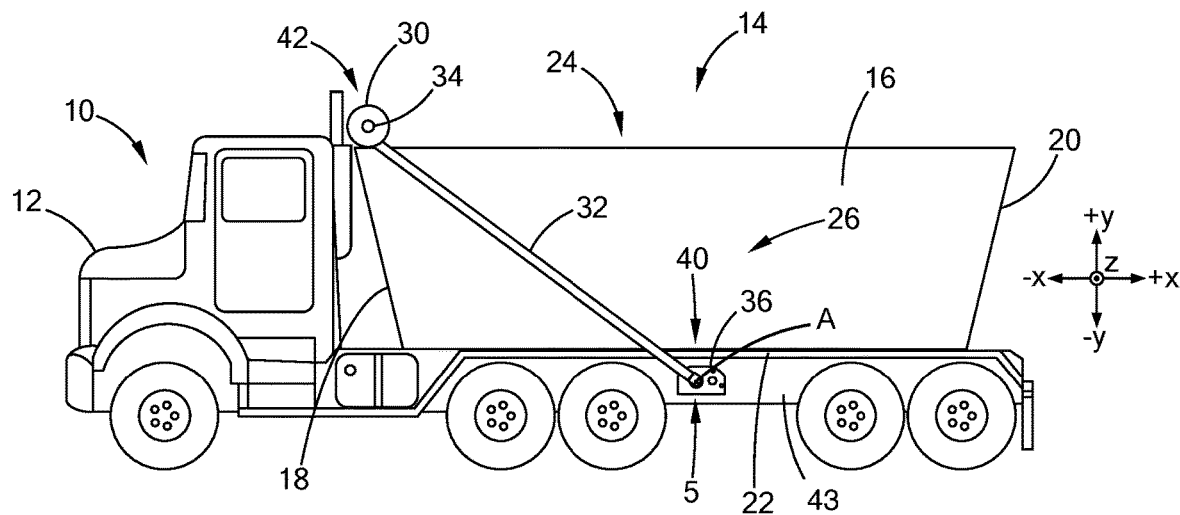
FIG. 1A is a perspective view of a truck with a tarpaulin system in an uncovered state in accordance with the teachings of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The present disclosure provides for a tarpaulin system that is operable in one of a retracted and an extended state. When the tarpaulin system is in the extended state, the tarp system can uncover and cover a truck with a tarpaulin, as described below in further detail. Furthermore, when the tarpaulin system is in the retracted state, the truck may transport the materials stored in a container and inhibit transverse protrusions of the tarpaulin system, thereby reducing a width of the truck during transport.

Figure 1B:
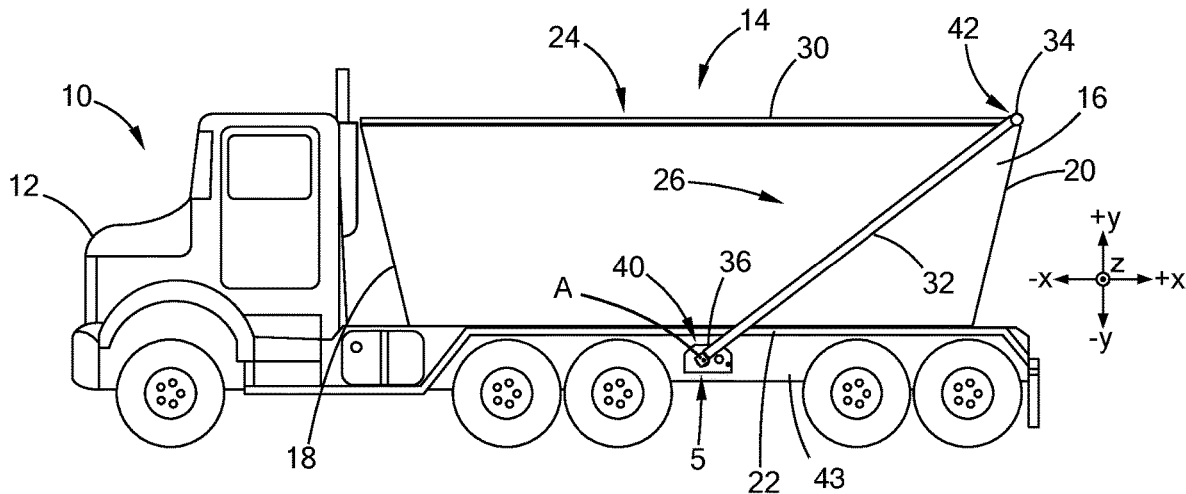
FIG. 1B is a perspective view of a truck with a tarpaulin system in a covered state in accordance with the teachings of the present disclosure.

Referring to FIGS. 1A-1B, a tarpaulin system 5 (hereinafter "tarp system 5") for a truck 10 is shown. In one form, the truck 10 may be any type of truck that can be used with an open-top container, such as a dump truck. The truck 10 may include a cab 12 and a container 14 having a pair of side walls 16 (only one shown in FIGS. 1A-1B), a front wall 18, a rear wall 20, and a bottom wall 22 collectively defining a chamber 24 in which various materials may be stored during transportation. In one form, the rear wall 20 is configured to swing open when the container 14 is tilted upwardly (+y direction) to dump the material therefrom.

In one form, the tarp system 5 includes a roll-out cover system 26 that includes a tarp 30, a pair of pivot arms 32 (only one shown in FIGS. 1A-1B), a tarp roller 34, and a pair of roll-out cover housings 36 (only one shown in FIGS. 1A-1B). The tarp 30 may be made of a canvas material, a polymeric material, or any other flexible material that is rollable around the tarp roller 34. Each of the pivot arms 32 includes a pivot end 40 and a free end 42. One of the pivot arms 32 is mounted adjacent one of the roll-out cover housings 36, and the other pivot arm 32 is mounted adjacent the other roll-out cover housing 36. In one form, the pair of roll-out cover housings 36 are disposed on a chassis 43 of the truck 10. It should be understood that the pair of roll-out cover housings 36 may be disposed at other locations of the truck 10, such as the container 14.

In one form, the tarp system 5 may be in one of an uncovered state and a covered state. When transitioning from the covered state to the uncovered state, the pivot arms 32 are rotated about an axis 'A' of the roll-out cover housings 36 extending along a width (z direction) of the truck 10 (e.g., the pivot end 40 the pivot arm 32 shown in FIGS. 1A-1B rotates counter-clockwise about the axis A) from the rear wall 20 to the front wall 18, and the tarp 30 is rolled around or onto the tarp roller 34. When transitioning from the uncovered state to the covered state, the pivot arms 32 are rotated about the A axis from the front wall 18 to the rear wall 20, and the tarp 30 is unrolled from the tarp roller 34 to cover the container 14. Accordingly, the truck 10 may include various known actuators and controllers (not shown) for rotating the pivot arms 32.

Figure 2A:
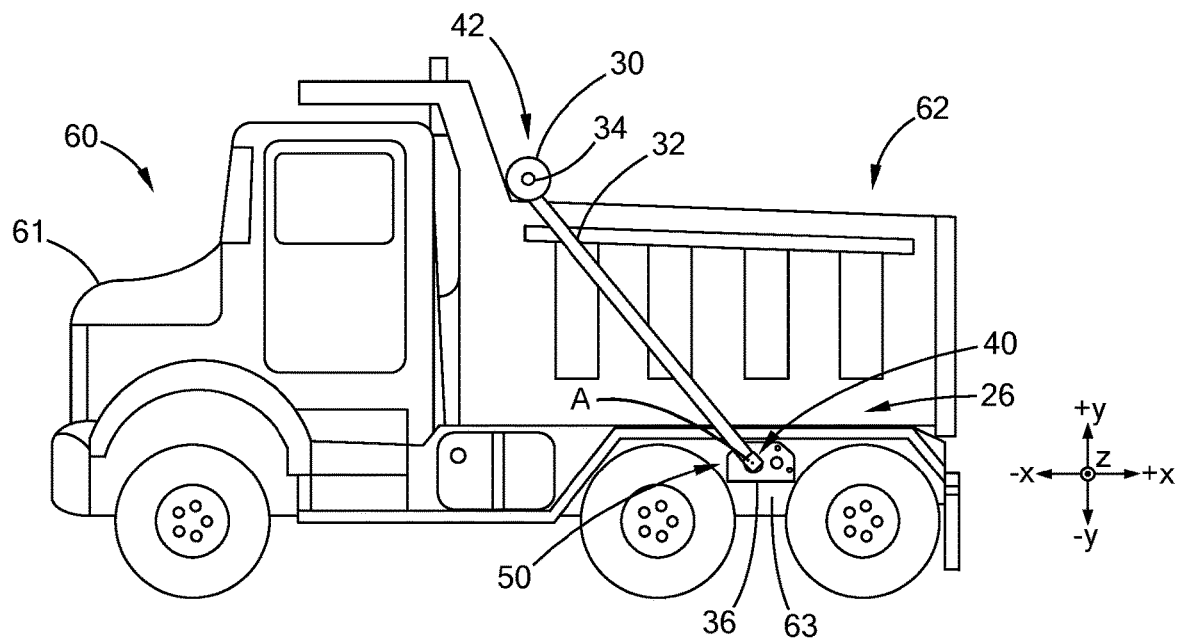
FIG. 2A is a perspective view of a roll-off trailer with a tarpaulin system in an uncovered state in accordance with the teachings of the present disclosure.
Figure 2B:
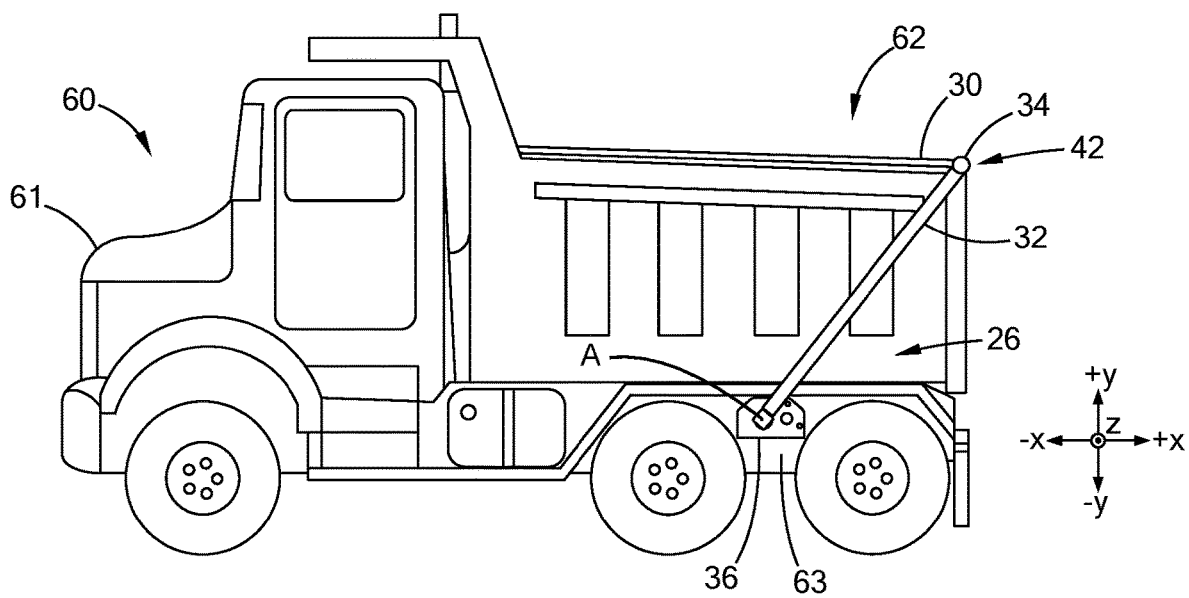
FIG. 2B is a perspective view of a roll-off trailer with a tarpaulin system in a covered state in accordance with the teachings of the present disclosure.

Referring to FIGS. 2A-2B, a truck 60 including a cab 61, a container 62 attached to a roll-off trailer 63, and a tarp system 50 are shown. The tarp system 50 is similar to tarp system 5, but in this form, a pair of roll-out cover housings 36 are disposed on the roll-off trailer 63 as opposed to a chassis 64 of the truck 60.

Referring to FIGS. 3-6, a partial perspective view of a tarp system 100 (e.g., one of tarp systems 5, 50) for a truck 200 (e.g., one of trucks 10, 60) is shown. While the tarp system 100 is shown on one side of the truck 200, it should be understood that the tarp system 100 may be included on both sides of the truck 200.

Figure 3:
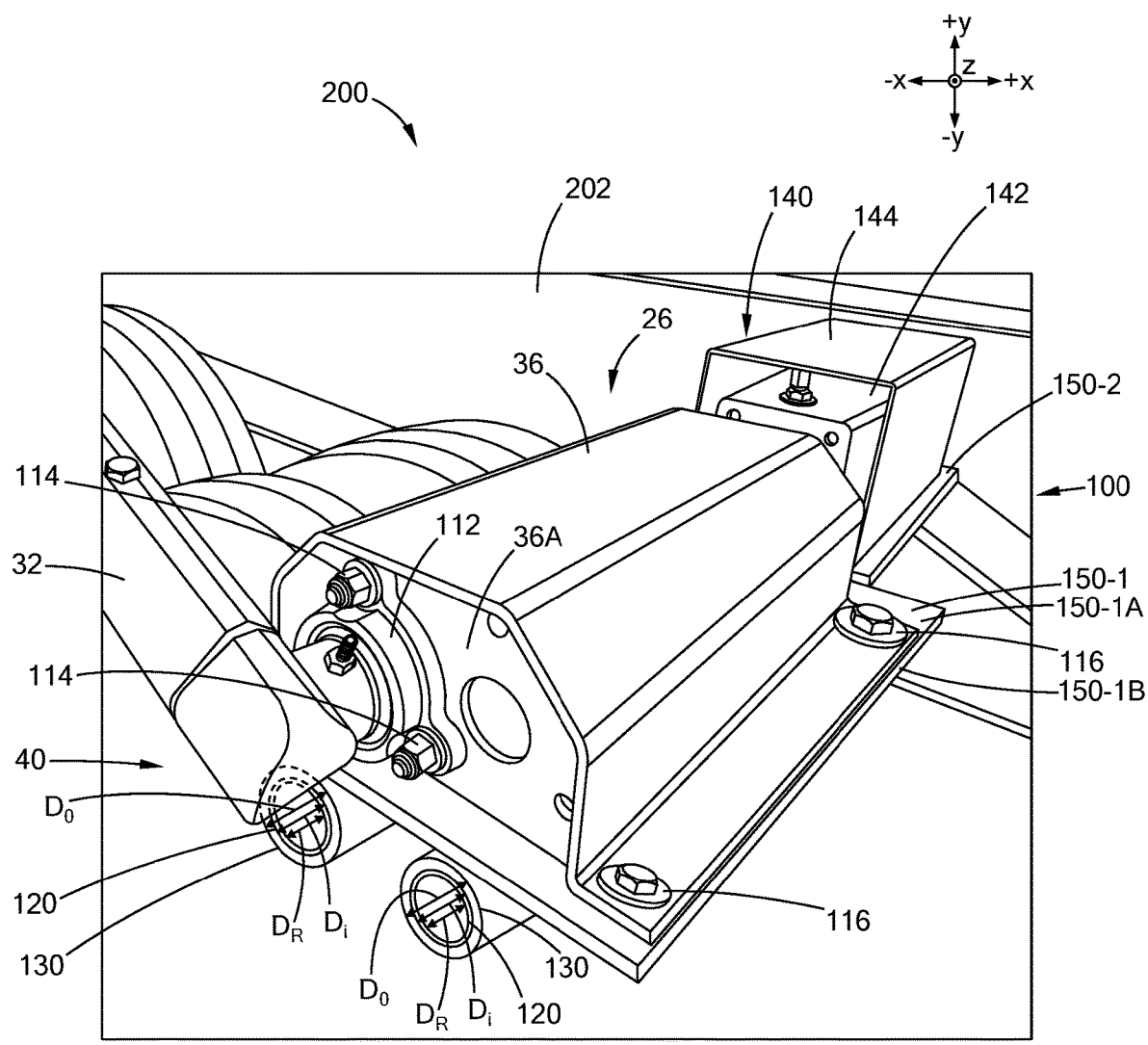
FIG. 3 is a perspective view of a tarpaulin system in accordance with the teachings of the present disclosure.
Figure 5:
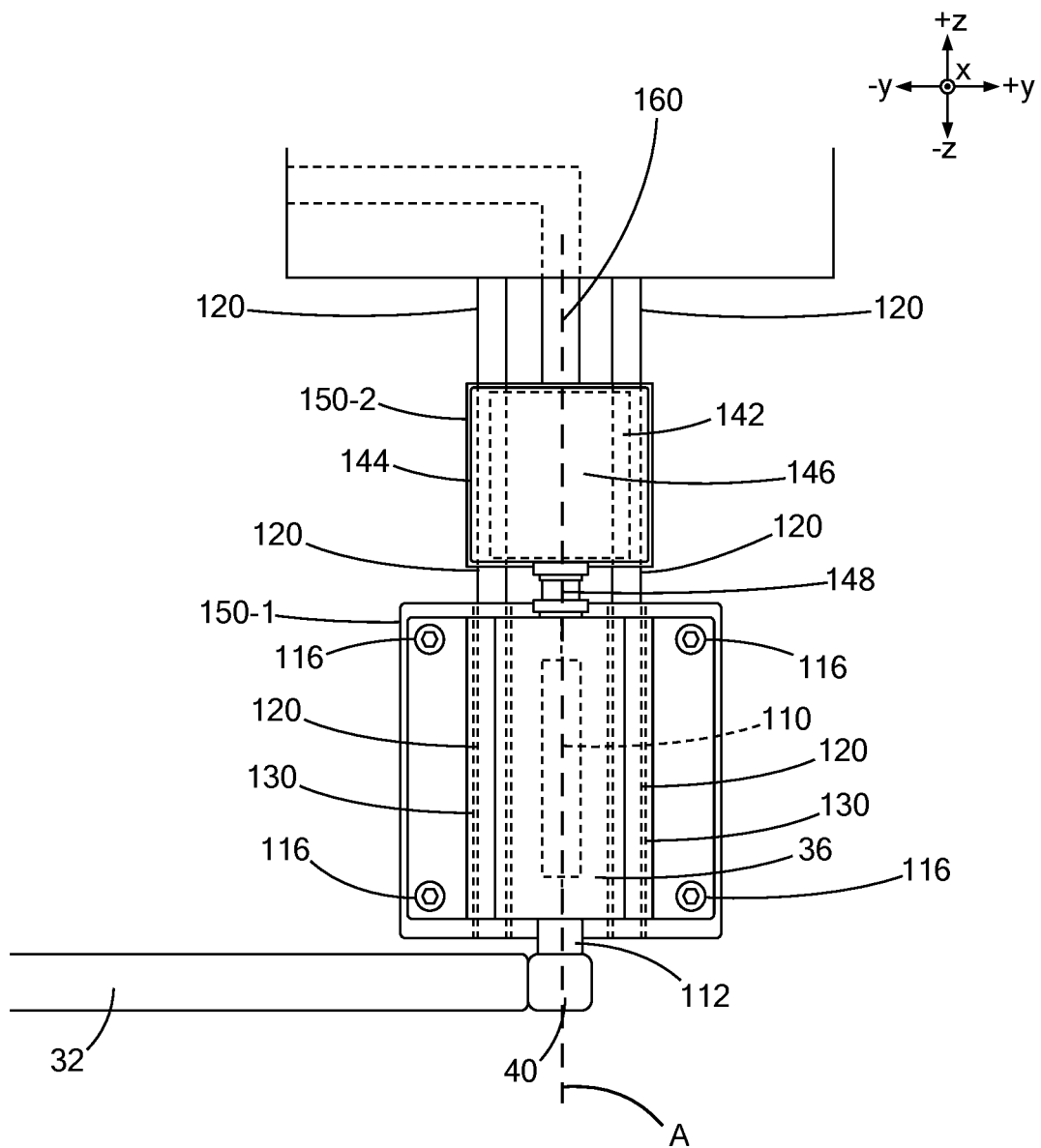
FIG. 5 is a top view of a tarpaulin system in a retracted state in accordance with the teachings of the present disclosure.
Figure 6:
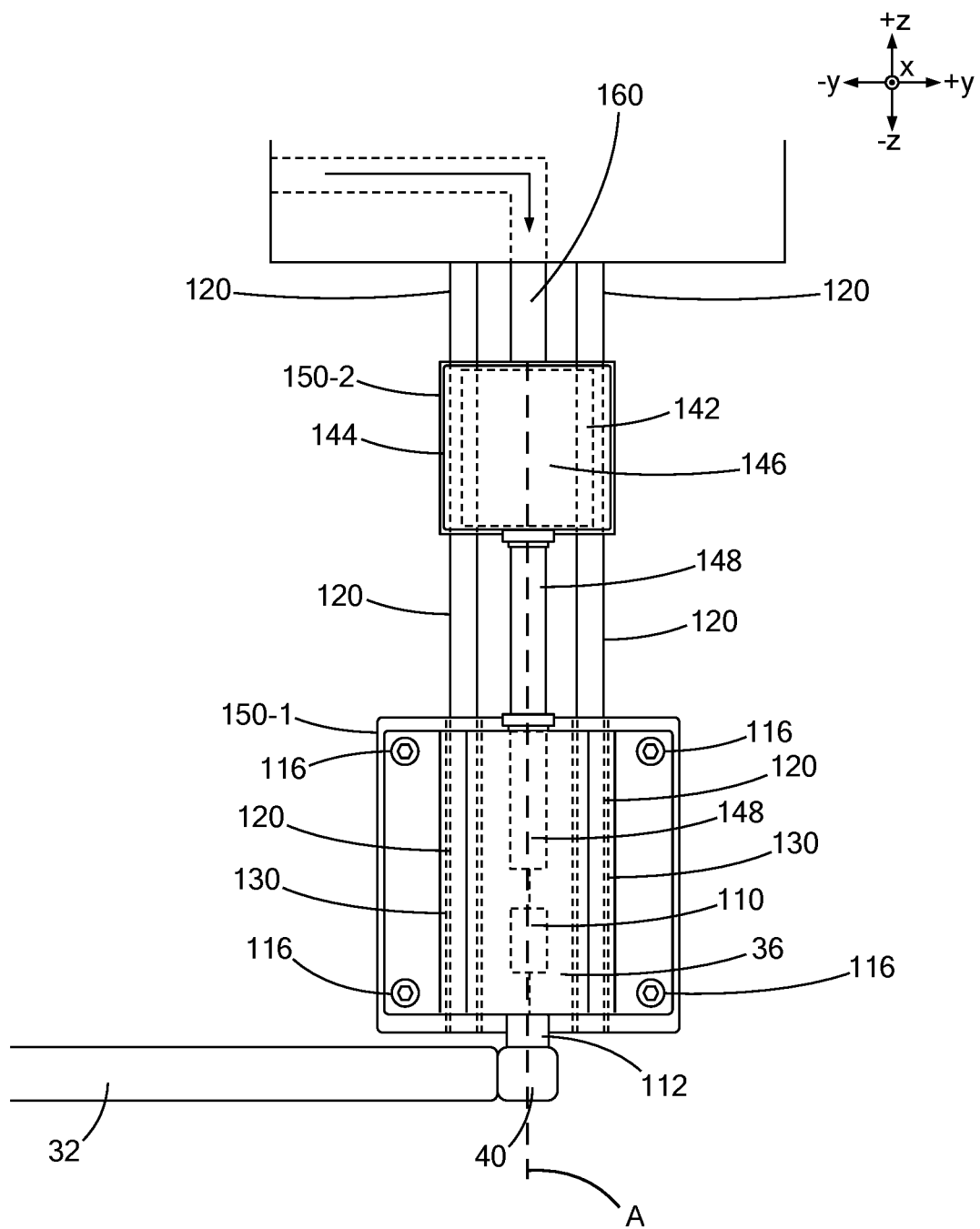
FIG. 6 is a top view of a tarpaulin system in an extended state in accordance with the teachings of the present disclosure.

In one form, the tarp system 100 includes the roll-out cover system 26, which further includes a spring 110 (FIGS. 5-6), a pivot arm gasket 112 (FIGS. 3, 5-6), pivot arm fasteners 114 (FIG. 3), and housing fasteners 116 (FIGS. 3, 5-6). In one form, the pivot arm gasket 112 is fastened to an outer surface 36A (FIG. 3) of the roll-out cover housing 36 using pivot arm fasteners 114 and operatively couples the spring 110 to the pivot end 40 of the pivot arms 32. In one form, the roll-out cover housings 36 at least partially surround the spring 110. In one form, the spring 110 assists in rotation of the pivot arms 32 when transitioning between the covered state and the uncovered state. As an example, the spring 110 is wound up (and thereby reduces its length) when the pivot arms 32 rotate in one direction, and the spring 110 unwinds (and thereby extends) when the pivot arms 32 rotate in the opposite direction.

Figure 4:
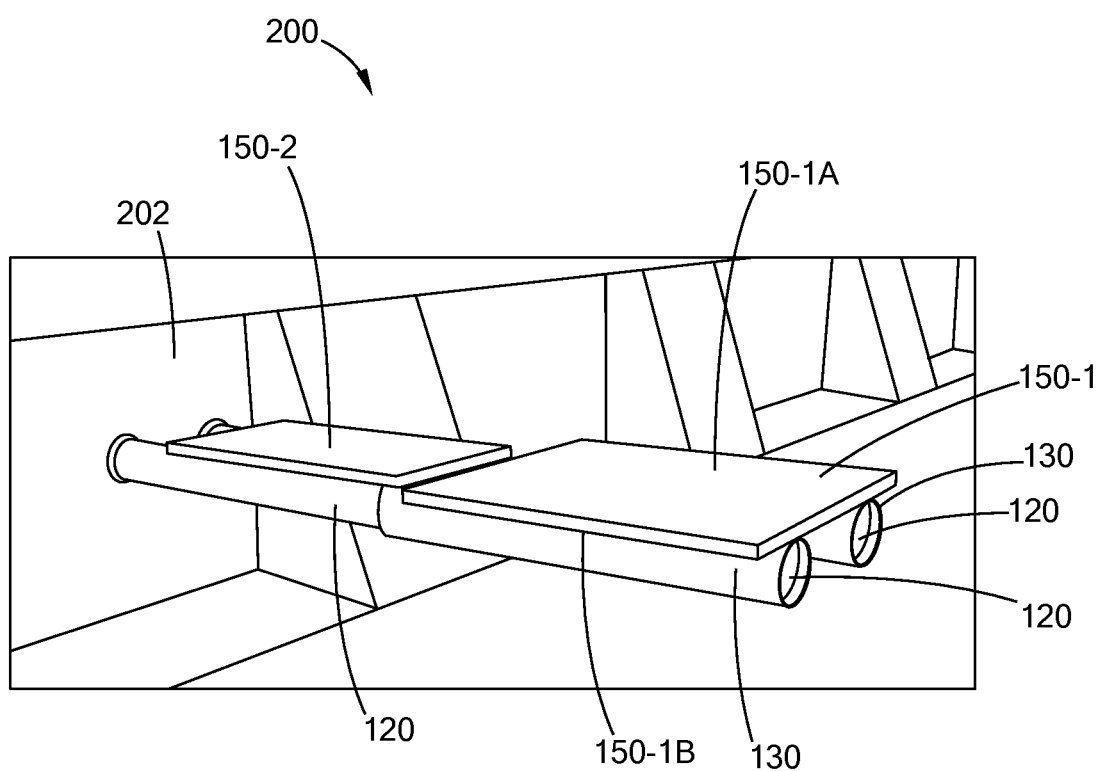
FIG. 4 is a perspective view of a pair of support plates, one or more rods, and one or more rod housings in accordance with the teachings of the present disclosure.

Additionally, the tarp system 100 includes one or more rods 120, one or more rod housings 130, a pneumatic system 140, a first support plate 150-1, and a second support plate 150-2 (collectively referred to as "support plates 150"). In one form and as shown in FIGS. 4-6, the one or more rods 120 and the one or more rod housings 130 are attached to a truck interface 202 (i.e., one of the chassis 43 and the roll-off trailer 63) of the truck 200 and extend transversely (i.e., in the z-direction) from the container 14. In one form, the one or more rod housings 130 are disposed along the one or more rods 120 and are configured to transversely slide (i.e., in the ±z-direction) along the one or more rods 120 based on a pneumatic force generated by the pneumatic system 140, as described below in further detail. To facilitate the sliding of the one or more rod housings 130, a lubricant and/or a bearing may be provided between the one or more rod housings 130 and the one or more rods 120. In one form, the one or more rods 120 are made of any suitable material for welding or fastening the one or more rods 120 to the truck interface 202. Non-limiting examples of such a suitable material include steels, stainless steels and aluminum alloys, among others.

In one form, the one or more rod housings 130 have a geometry to accommodate a geometry (e.g., dimensions, contours, shapes, etc.) of the one or more rods 120. As an example, the one or more rod housings 130 may have a hollow cylindrical shape to accommodate the cylindrical shape of the one or more rods 120. Furthermore, the one or more rod housings 130 may include an inner diameter (Di) (FIG. 3) and an outer diameter (Do), and the one or more rods 120 may have a rod diameter (DR) that is less than the inner diameter of the rod housing 130. It should be understood that the one or more rod housings 130 and the one or more rods 120 may have various geometries in other forms and is not limited to the examples described herein.

In one form and as shown in FIGS. 3 and 5-6, the pneumatic system 140 includes a pneumatic actuator 142 and a pneumatic housing 144. The pneumatic housing 144 at least partially surrounds the pneumatic actuator 142. In one form, the pneumatic actuator 142 is configured to slidably and transversely move the roll-out cover system 26 along the one or more rods 120 based on a pneumatic force. As an example and as shown in FIGS. 5-6, the pneumatic actuator 142 includes a pneumatic cylinder 146 and a pneumatic piston rod 148 that operatively couples the pneumatic actuator 142 and the spring 110. In one form, the pneumatic piston rod 148 is configured to extend or retract the roll-out cover system 26 along the one or more rods 120 based on a pneumatic force generated by the pneumatic piston rod 148.

In one form, the roll-out cover housing 38 is fastened to a first surface 150-1A of the first support plate 150-1 using the housing fasteners 116, and the one or more rod housings 130 are welded or fastened to a second surface 150-1B of the first support plate 150-1. In one form, the pneumatic actuator 142 and the pneumatic housing 144 are welded or fastened to the second support plate 150-2. As such, the roll-out cover housing 38 fastened to the first support plate 150-1 is transversely moveable relative to the second support plate 150-2 via sliding of the rod housing 130 along the one or more rods 120.

During operation, the pneumatic system 140 may be in a retracted or extended state. In the extended state, the pneumatic actuator 142 receives compressed air via pneumatic line 160 (as illustrated by the arrow in FIG. 6), which may be operatively coupled to a pneumatic control system and/or pneumatic supply (not shown) of the truck 200. In response to receiving the compressed air, the pneumatic piston rod 148 extends transversely from the pneumatic actuator 142, as shown in FIG. 6. As such, when the pneumatic system 140 is in the extended state, the tarp system 100 can readily transition between the covered state and the uncovered state, as described above.

Furthermore, when the pneumatic system 140 is in the retracted state, the pneumatic actuator 142 no longer receives compressed air from the pneumatic control system and/or pneumatic supply of the truck 200 and via the pneumatic line 160. Accordingly, the pneumatic piston rod 148 retracts transversely toward the pneumatic actuator 142, as shown in FIG. 5. As such, when the pneumatic system 140 is in the retracted state, the truck 200 may transport the materials stored within the container 14 while minimizing the transverse protrusions of the roll-out cover system 26, thereby reducing a width of the truck 200 during transport.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice; material, manufacturing, and assembly tolerances; and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

In this application, the term "module" and/or "controller" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

What is claimed is:

1. A tarpaulin system for a container, the tarpaulin system comprising:
   one or more rods extending transversely from the container;
   a pneumatic system comprising a pneumatic actuator;
   a roll-out cover system comprising a spring;
   a first support plate comprising a first surface and a second surface;
   a second support plate; and
   one or more rod housings extending transversely from the container, wherein:
      the one or more rod housings are slidably disposed along the one or more rods;
      the roll-out cover system is at least partially attached to the first surface;
      the one or more rod housings are attached to the second surface;
      the pneumatic system is attached to the second support plate; and
      the pneumatic actuator is configured to slidably and transversely move the roll-out cover system along the one or more rods based on a pneumatic force generated by the pneumatic actuator.

2. The tarpaulin system of claim 1, wherein the pneumatic system further comprises a pneumatic housing at least partially surrounding the pneumatic actuator.

3. The tarpaulin system of claim 2, wherein the pneumatic housing is attached to the second support plate.

4. The tarpaulin system of claim 1, wherein:
   the pneumatic actuator comprises a pneumatic cylinder and a pneumatic piston rod that operatively couples the pneumatic actuator and the spring; and
   the pneumatic piston rod is configured to move the roll-out cover system along the one or more rods based on the pneumatic force.

5. The tarpaulin system of claim 1, wherein the one or more rod housings have a geometry to accommodate a geometry of the one or more rods.

6. The tarpaulin system of claim 5, wherein:
   the one or more rod housings have a first diameter;
   the one or more rods have a second diameter; and
   the first diameter is greater than the second diameter.

7. The tarpaulin system of claim 5, wherein:
   the one or more rod housings have an inner diameter and an outer diameter;
   the one or more rods have a second diameter;
   the inner diameter is greater than the second diameter; and
   the outer diameter is greater than the inner diameter.

8. The tarpaulin system of claim 1, wherein the roll-out cover system further comprises a cover housing at least partially surrounding the spring.

9. The tarpaulin system of claim 8, wherein the cover housing is attached to the first surface.

10. The tarpaulin system of claim 1, wherein the roll-out cover system further comprises a pivot arm.

11. The tarpaulin system of claim 10, wherein the pivot arm is rotatable along an axis of the container to cover the container.

12. A tarpaulin system for a container, the tarpaulin system comprising:
   one or more rods extending transversely from the container;
   a pneumatic system comprising a pneumatic actuator and a pneumatic housing;
   a roll-out cover system comprising a spring and a cover housing;
   a first support plate comprising a first surface and a second surface;
   a second support plate; and
   one or more rod housings extending transversely from the container, wherein:
      the one or more rod housings are slidably disposed along the one or more rods;
      the cover housing is attached to the first surface and at least partially surrounds the spring;
      the one or more rod housings are attached to the second surface;
      the pneumatic housing is attached to the second support plate and at least partially surrounds the pneumatic actuator; and
      the pneumatic actuator is configured to slidably and transversely move the roll-out cover system along the one or more rods based on a pneumatic force generated by the pneumatic actuator.

13. The tarpaulin system of claim 12, wherein:
   the pneumatic actuator comprises a pneumatic cylinder and a pneumatic piston rod that operatively couples the pneumatic actuator and the spring; and
   the pneumatic piston rod is configured to move the roll-out cover system along the one or more rods based on the pneumatic force.

14. The tarpaulin system of claim 12, wherein the one or more rod housings have a geometry to accommodate a geometry of the one or more rods.

15. The tarpaulin system of claim 14, wherein:
   the one or more rod housings have a first diameter;
   the one or more rods have a second diameter; and
   the first diameter is greater than the second diameter.

16. The tarpaulin system of claim 14, wherein:
   the one or more rod housings have an inner diameter and an outer diameter;
   the one or more rods have a second diameter;
   the inner diameter is greater than the second diameter; and
   the outer diameter is greater than the inner diameter.

17. The tarpaulin system of claim 12, wherein the roll-out cover system further comprises a pivot arm.

18. The tarpaulin system of claim 17, wherein the pivot arm is rotatable along an axis of the container to cover the container.

19. A tarpaulin system for a container, the tarpaulin system comprising:
   one or more rods extending transversely from the container;
   a pneumatic system comprising a pneumatic actuator and a pneumatic housing;
   a roll-out cover system comprising a spring, a cover housing, and a pivot arm;
   a first support plate comprising a first surface and a second surface;
   a second support plate; and
   one or more rod housings extending transversely from the container, wherein:
      the one or more rod housings are slidably disposed along the one or more rods;
      the one or more rod housings have a geometry to accommodate a geometry of the one or more rods;
      the cover housing is attached to the first surface and at least partially surrounds the spring;

the one or more rod housings are attached to the second surface;

the pneumatic housing is attached to the second support plate and at least partially surrounds the pneumatic actuator; and the pneumatic actuator is configured to slidably and transversely move the roll-out cover system along the one or more rods based on a pneumatic force generated by the pneumatic actuator.

20. The tarpaulin system of claim 19, wherein the pivot arm is rotatable along an axis of the container to cover the container.

* * * * *